United States Patent [19]

Binder

[11] 4,078,368
[45] Mar. 14, 1978

[54] RAKE IMPLEMENT

[76] Inventor: Josef Binder, Bayerwaldstrasse 18, 8391 Strasskirchen, Germany

[21] Appl. No.: 673,008

[22] Filed: Apr. 2, 1976

[30] Foreign Application Priority Data

Apr. 22, 1975 Germany .................. 7512878[U]
Oct. 21, 1975 Germany .................. 2547111

[51] Int. Cl.² .............................................. A01D 7/00
[52] U.S. Cl. .......................... 56/400.01; 66/400.11
[58] Field of Search ............. 56/400, 400.01–400.21, 56/377

[56] References Cited

U.S. PATENT DOCUMENTS

| 220,511 | 10/1879 | White | 56/400.01 |
| 286,120 | 10/1883 | Drew | 56/400.11 |
| 623,708 | 4/1899 | Ensley | 56/400.11 |
| 1,209,060 | 12/1916 | Snyder | 56/400.11 |
| 1,791,266 | 2/1931 | Erickson | 56/400.01 |
| 2,886,937 | 5/1959 | Reidmiller | 56/400.01 |
| 3,038,292 | 6/1962 | van der Lely et al. | 56/377 |
| 3,096,609 | 7/1963 | Garrett et al. | 56/400 |
| 3,818,688 | 6/1974 | Drunmond | 56/400.01 |

FOREIGN PATENT DOCUMENTS 767,371  9/1967  Canada ................................. 56/330

Primary Examiner—Russell R. Kinsey
Attorney, Agent, or Firm—Alfred H. Rosen

[57] ABSTRACT

The invention relates to a rake comprising a crosshead, means provided on said crosshead enabling it to be fitted to a handle and a row of tines or the like secured to the crosshead, said crosshead being formed of a synthetic plastics material and said tines or the like being formed of metal and having one end embedded in the synthetic plastics material of the crosshead.

16 Claims, 10 Drawing Figures

RAKE IMPLEMENT

BACKGROUND OF THE INVENTION

Usually, known hand rakes, for example a hay rake, are formed entirely of wood, although this has a disadvantage of a relatively short effective life due to the fact that the implement is not very rugged, and also has the disadvantage of relatively expensive manufacture, since the row of tines, although they may be formed of the same material as the tool holder, i.e. the crosshead, still must be manufactured separately from the crosshead and then inserted into this latter, which from the outset means that the tines may possibly come loose from the crosshead.

Also known are hand rakes, for example rakes, wherein the crosshead consists of metal, the tines being integrally formed therewith. This type of manufacture is however expensive and does moreover mean that the hand rake may be quite weighty (approx. 800 g), which may excessively or prematurely fatigue the user of the hand rake if the work has to be performed over a prolonged period. In the case of a further type of hand rake, the tines are separate and are fitted to the crosshead which is formed for example from a metal tube, in that the top end of the tines are introduced into holes in the metal tube and are secured by being welded thereto.

All the known embodiments fail however fully to meet the demands made of them, since either by virtue of the material chosen, the hand rake becomes too heavy or by virtue of the method of manufacture chosen, the manufacturing costs are too high or it may be that due to the type of fixing means the tines may gradually become loosened. This latter disadvantage may easily become manifest under the rough usage to which the hand rake, for example intended as a hay rake, is frequently subjected.

SUMMARY OF THE INVENTION

The invention relates to a rake, for example an agricultural and/or horticultural hand rake for working of soil, plants, grass etc., the rake having a crosshead to which a handle can be fitted and which carries a row of tines or the like.

According to the present invention there is provided a rake comprising a crosshead provided with means enabling it to be fitted to a handle and a row of tines or the like secured to the crosshead, said crosshead being formed of a synthetic plastics material and said tines or the like being formed of metal and having one end embedded in the synthetic plastics material of the crosshead.

By reason of the fact that on the one hand the crosshead consists of synthetic plastics material while the tines or the like consists of metal, the tines or the like being attached to the crosshead by being embedded therein, simple manufacture combined with low weight is achieved, an additional advantage being the fact that the tool, subject to considerable loading, consists of basically rugged materials, whereas the crosshead is made in weight-saving manner from synthetic plastics material and simultaneously with its manufacture, can have embedded in it the row of tines or the like. Manufacture of the hand implement is thereby simplified since it comprises only two working steps, namely firstly the formation of the row of tines either by bending into a row of tines an uninterrupted length of steel wire or by forming individual tines from a wire bent to a V-shape or U-shape or from metal pins, and secondly embedding the top end of the row of tines into the synthetic plastics material of the crosshead simultaneously with the manufacture of the latter, for example during an injection moulding process or the like. By reason of the type of material selected for the crosshead, in conjunction with the material used for the tines, it is possible moreover, as already mentioned, to achieve an extremely low weight of hand rake which in the case of one practical embodiment of a rake, amounts to less than 300g calculated without the handle.

Since the tines are attached to the synthetic plastics crosshead by being embedded therein, there is at no time during use of the hand implement any danger of the tines becoming loosened or detached, in addition to which, by reason of thenature of their fixing, the tines have at the same time a certain elasticity. Any excessive loading forces on the tines which may occur during use of the hand implement are, according to a preferred form of embodiment, absorbed by a flexurally stiff (i.e.: flexure resistant) strengthening part which is at the same time embedded in the crosshead behind the tines.

Preferably, the row of tines or the like are formed of spring steel wire, each tine or the like in the row having its free end curved or rounded. By reason of the material chosen for the row of tines, not only is there satisfactory flexural elasticity guaranteed, but also by virtue of the curved or rounded shape provided at their free end, the rake is easy to use, since, the rounded ends of the tines allow it to slide easily over the soil.

According to a preferred form of embodiment, it is envisaged that the row of tines or the like consist of individual tines which are bent to a V-shape or a U-shape, the tines being placed in one plane alongside one another and being embedded in the synthetic plastics material of the crosshead. Such tines are easily produced and their upper ends can easily be inserted into the mould shortly before the synthetic plastics crosshead is cast. If, furthermore, as is envisaged according to another feature of the invention, the individual tines, bent into a V-shape, are in each case bent outwardly at their top ends which are embedded in the plastics material of the crosshead, it is ensured that tines which are so constructed can be secured in the crosshead entirely without any risk of becoming detached, and without this measure requiring special fixing means such as are needed with known hand rakes.

Advantageously, the upper tine ends are bent approximately 30° out of the longitudinal axis of the associated tine arm, whereby it is also possible for the upper tine ends to be bent instead or in addition to this, out of the plane of the tine arms.

According to a modified form of embodiment, the row of tines may also be constituted by an uninterrupted length of steel wire bent into a plurality of V-shapes or U-shapes, the upper ends of each tine being advantageously joined to an adjacent tine by a curved part connecting two adjacent tines, said curved connecting parts being completely embedded in the crosshead. In the case of this embodiment, it is true that manufacture of the uninterrupted length of steel wire into a plurality of tines by bending may result in a greater manufacturing cost than the production of individual V-shaped or U-shaped tines, but it does offer the advantage that insertion of the row of tines into the synthetic plastics crosshead involves less structural complication.

In any case, a further advantage arises if a stiff (i.e.: flexure resistant) reinforcing member, particularly made from metal, extending longitudinally of the crosshead and bearing against the upper tine ends, is embedded in the crosshead behind the upper tine ends. In consequence, it is possible not only to achieve increased flexural rigidity of the crosshead and also increased resistance to the reaction forces exerted by the tines, but there is also the advantage that if the crosshead, by virtue of irregular forces being applied, should break in one plane, the broken-off part of the crosshead does not fall off but remains attached to the unbroken part of the crosshead by virtue of its being connected thereto via the reinforcing member.

In a further development of the invention, the reinforcing member may be of angle section profile, such as an L-shaped profile or other suitable profile, one arm of which bears against the upper tine ends. Expediently, said arm of the reinforcing member profile which bears against the tope tine ends is profiled for intimate connection with the plastics material of the crosshead.

The profile of the reinforcing member may have either two arms of equal or unequal length extending at right-angles to each other or it may be a U-shaped profile, in which case the two arms of this U-shaped profile then engage around the upper tine ends.

According to a modified form of embodiment, the flexurally stiff reinforcing member may comprise a reinforcing wire which in addition to being embedded in the crosshead, may be attached to the upper tine ends, for example by spot-welding.

Further advantages with regard to manufacture arises if the reinforcing wire consists of the same material as that from which the tines are formed and if the reinforcing wire is also of the same thickness as that from which the tines are formed.

It goes without saying that it is possible for the mounting which receives the handle for the hand rake according to the invention to be produced separately from the crosshead and for the connection between handle mounting and crosshead to be for example detachable, after the fashion of a dovetail joint. According to a preferred form of embodiment of the invention, however, the mounting for the handle is integrally moulded with the crosshead, in which case it is expedient for the handle mounting to be additionally connected to the crosshead by bilaterally extending flat transverse webs.

It falls within the scope of the invention that the handle mounting, having an inner cone shape, has on the inside at least two mutually-facing longitudinal ribs which are offset with regard to each other and in relation to the longitudinal axis of the handle mounting, their height increasing in the direction of the bottom of the mounting.

With regard to the flexurally stiff reinforcing part embedded in the crosshead behind the tines, it should also be stated that if the tines are constructed as individual tines bent to a V-shape or U-shape, then the reinforcing part can also be constructed as a U-shaped profile with longitudinal slots provided in the transverse web, whereby in this case the top bent-over ends of the tines are fitted into the longitudinal slots in the transverse web of the U-shaped profile.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail certain illustrative embodiments of the invention, these being indicative of but some ways in which the principle of the invention may be employed.

In said annexed drawings.

DESCRIPTION OF THE PREFERRED EMBODIMENTS

Figure 1:
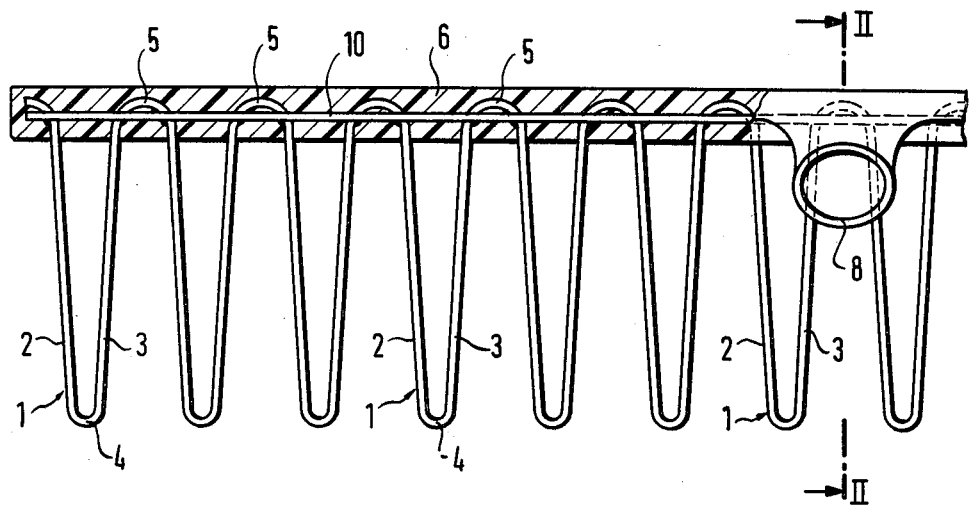
FIG. 1 is a partly sectioned view of the hand rake according to the invention, viewed obliquely from above.
Figure 3:
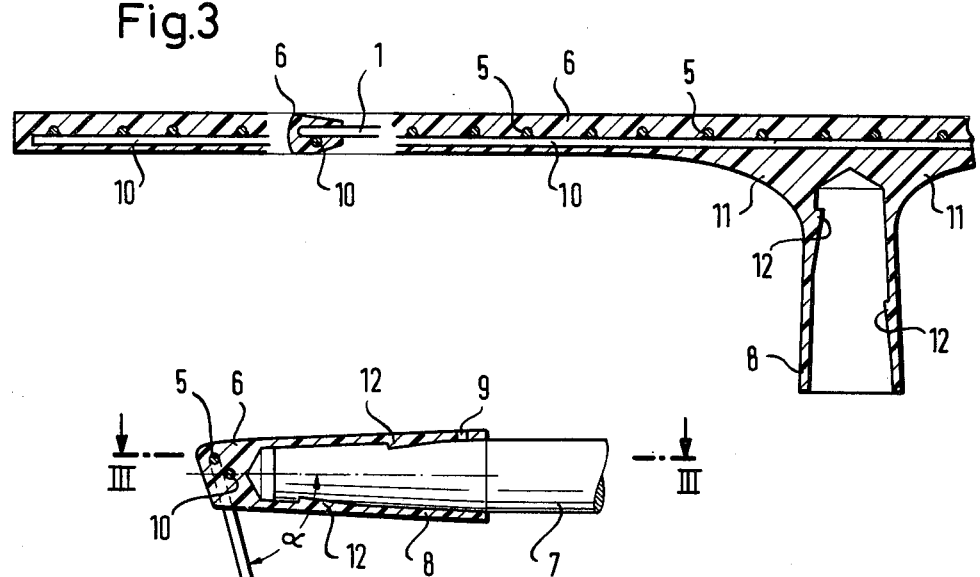
FIG. 3 is a partial section taken along the line III—III indicated in FIG. 2 showing in addition a profile view of the crosshead and a tine.
Figure 2:
FIG. 2 is a section taken along the line II—II indicated in FIG. 1.

As can be seen from FIGS. 1 to 3, the hand rake has a row of tines 1 which are formed from an uninterrupted length of steel wire of for example circular cross-section. In this case, the steel wire is so bent that a plurality of tines 1 are produced which are disposed one beside another in one plane. Said tines 1 may naturally also be bent into a V-shape or they may be so constructed that their individual arms 2, 3 lie parallel with and closely adjacent one another.

The individual arms 2, 3 of each tine 1 are, as FIG. 1 shows, connected at their bottom end by a curved portion 4 of relatively small radius and at their top end adjacent tines are interconnected by a curved portion 5 of larger radius than portion 4.

The crosshead 6 of the rake consists of a synthetic plastics material of low weight but of good loading capacity and it is for example made by injection moulding process or by a foaming process using two chemical components. In this respect, the profile of the crosshead 6 has more or less the form (shown on the left in FIG. 3) of a conically downwardly tapering circle with a rounded top and a plane bottom. To accommodate a handle 7, a hollow mounting 8 open at one end is integrally moulded on the crosshead 6 which extends transversely of the handle 7 of the rake and, in conventional manner, said mounting 8 may have at any desired and suitable location a bore 9 for additional securing of the handle 7 to the mounting 8, by means of a nail, a screw or the like.

The upper ends of the tines 1, i.e. the curved portions 5 each of which connects two tines 1 to each other, are attached to the crosshead 6 by being completely embedded therein in the manner shown in the drawings. This embedding of the top tine ends 5 into the crosshead 6 naturally takes place simultaneously with production of the synthetic plastics crosshead 6, the position of the tines 1 in relation to the crosshead 6 or the handle 7 being preferably so chosen that the tines 1 from an angle $\alpha$ of for example 75° with respect to the longitudinal central axis of the handle 7.

For reinforced supporting of the tines 1, a reinforcing means in the form of a reinforcing wire 10 is also embedded in the crosshead 6, said reinforcing wire 10 extending coaxially of the longitudinal central axis of the crosshead 6 and being disposed behind and approximately halfway up the curved tine ends 5. In consequence, not only is it possible for excessive loadings on the tines 1 but also localised loadings on said tines 1 to be altogether and evenly absorbed by the crosshead 6. The reinforcing wire 10 is separately fixed to the top tine ends 5, for example by spot-welding. The reinforcing wire 10 preferably consists of the same material and also is of the same thickness as the wire from which the tines 1 are formed.

To enhance rigidity, the handle mounting 8 is additionally connected to the crosshead 6 by bilaterally extending flat transverse webs 11, as FIG. 3 shows. These transverse webs 11 are suitably curved at their outer edge.

In the case of a practical form of embodiment, the handle mounting 8 is approximately 75 to 80 mm deep and widens out conically from the bottom to the opening of the mounting. To enhance the fixing of the handle 7, there are on the inside wall of the handle mounting 8 two mutually-facing longitudinal ribs 12 which are for example 30 mm long, which rise in the direction of the mounting bottom, i.e. they are of increasing height, and furthermore they are offset to one another in relation to the longitudinal axis of the mounting 8. Naturally, it is also possible to provide more than two longitudinal ribs 12, i.e. to provide three for example.

Figure 4:
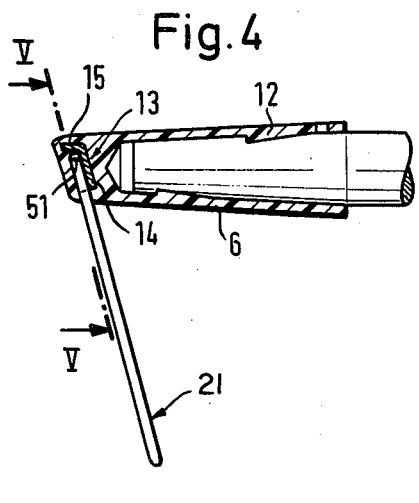
FIG. 4 shows a modified embodiment of the rake in a view corresponding to that shown in FIG. 2.
Figure 5:
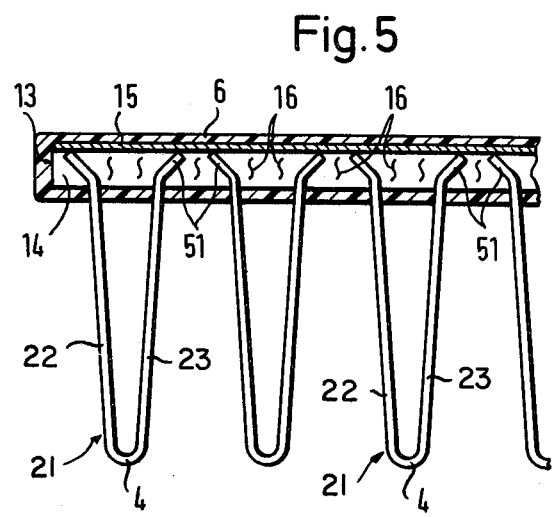
FIG. 5 shows a section taken along the line V—V indicated in FIG. 4.

In the modified form of embodiment shown in FIGS. 4 and 5, the row of tines comprises individual tines 21 which are bent into a V-shape and which are likewise laid in one plane one beside another and embedded in the synthetic plastics material of the crosshead 6. In this case, the individual V-shaped tines 21 are, at their top ends 51, in each case bent outwards at an angle of approximately 30° from the longitudinal axis of the associated tine arm 22 or 23.

Instead of the reinforcing wire 10, according to the form of embodiment shown in FIGS. 1 to 3, where the embodiment according to FIGS. 4 and 5 is concerned, an L-shaped angle section reinforcing member 13 is embedded into the crosshead 6 as a flexure resistant supporting part which is positioned behind the individual tines 21. This reinforcing member 13 has a longer arm 14 and also a shorter arm 15, the longer arm 14 resting against the upper tine ends 51, while the shorter arm 15 of the angle profile 13 engages over the top tine ends 51. For intimate connection with the synthetic plastics material of the crosshead 6, the longer arm 14 of the angle profile 13 may be suitably profiled, as indicated at 16 in FIG. 5.

Figure 6A:
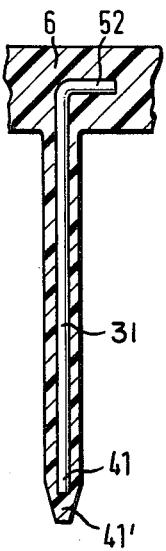
FIGS. 6a to 6e shows further modified forms of tines which are sheathed with synthetic plastics material, those in FIGS. 6a and 6b being entirely sheathed, and those in FIGS. 6c, 6d and 6e having their respective tips exposed from the plastics material.
Figure 6B:
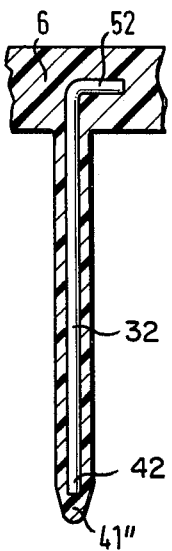

In the further modified forms of embodiment of hand rake shown in FIGS. 6a to 6e, the row of tines consist of individual rod-shaped tines 31, 32, 33, 34 and 35 respectively, which are covered with synthetic plastics material and which are individually embedded into the synthetic plastics material of the crosshead 6 at their top end which may be bent over, thickened or appropriately constructed as a bearing surface. In this respect, it is common to the embodiments according to FIGS. 6a to 6c that each individual tine 31, 32, 33, respectively, has a top end 52 bent over at a right-angle and embedded in the synthetic plastics material of the crosshead 6. The synthetic plastics material which encloses each of the individual tines 31, 32, 33, respectively is integrally moulded with the synthetic plastics material of the crosshead 6. While in the case of the embodiment shown in FIG. 6a the synthetic plastics tip 41' which completely encloses the bottom end 41 of each individual tine 31 tapers conically and is flattened at its end, the corresponding synthetic plastics tip 41" of the embodiment shown in FIG. 6b is conically tapering has a rounded-off end at the bottom end 42 of each individual tine 32. In contrast, in the embodiment shown in FIG. 6c, the bottom end 43 of each tine 1 has a uniformally curved and more or less reversed-mushroom rounded shape, is exposed from the synthetic plastics material which encloses the tine 33. In this case, the individual tines 33 are preferably produced in that a non-hardened steel wire is placed into the corresponding mould with a rectangularly bent-over top end 52 and an upset bottom end 43, the steel wire being only then hardened.

Figure 6C:
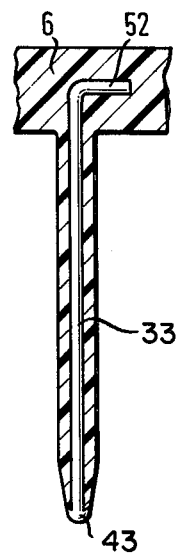
Figure 6D:
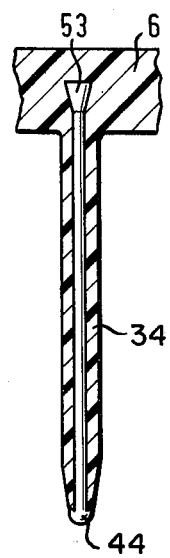
Figure 6E:
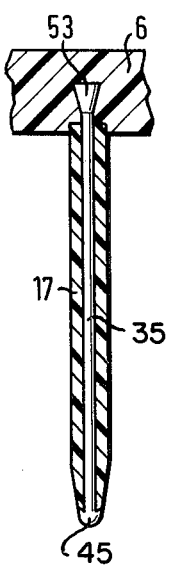

Common to the forms of embodiment shown in FIGS. 6d and 6e is the fact that the lower end 44 and 45 respectively of each tine 34, 35 is of the form shown in FIG. 6c and that the top end 55, 56 of each tine 34, 35, respectively, instead of being bent over at a right-angle, is of thickened construction and that in this way can be reliably held in the synthetic plastics material of the crosshead 6. Whereas however in the case of the embodiment shown in FIG. 6d the plastics material enclosing the tine 34 is integrally moulded with the plastics material of the crosshead 6, the plastics material 17 enclosing the tines 35 of the embodiment shown in FIG. 6e is separate from the synthetic plastics material of the crosshead 6, which means that the tine 35 is enclosed with the plastics material 17 prior to being embedded in the plastics material of the crosshead 6. In this way, in comparison with the forms of embodiment according to FIGS. 6a to 6d, it is possible to achieve a simpler tool for producing the crosshead 6. As can be seen from FIG. 6e, the plastics material 17 enclosing the tine 35 projects into a recess provided in the plastics material of the crosshead 6 where it is likewise securely held in position.

It goes without saying that where all the forms of embodiment shown in FIGS. 6a to 6e are concerned, it is possible to provide at the corresponding place in the crosshead 6 a flexurally rigid reinforcing member in the form of a reinforcing wire 10, or an angle profile reinforcing member 13, or a T-shaped profile reinforcing member or some other suitable profile.

In the case of all the forms of embodiment according to FIGS. 6a to 6e, the tines 31 through 35 including the plastics material enclosing them, correspond in their length and thickness to the previously known teeth of wooden rakes, so that it is possible therefore to achieve a great similarity in appearance to the known hay rake, but also a substantially greater durability and effective life with a decidedly reduced weight.

I, therefore, particularly point out and distinctly claim as my invention:

1. A rake or similar hand implement for working the ground or for moving plants, grass, or the like, comprising a crosshead of synthetic plastics material which carries a handle socket and at which metal tines are secured at an angle thereto, said tines having anchoring means at their ends opposite to their free ends, flexure-resistant reinforcing means bearing against said anchoring means and extending in logitudinal direction of the crosshead, said anchoring means and reinforcing means being embedded in the synthetic plastics material of the crosshead and enclosed thereby on all sides.

2. A rake according to claim 1, wherein the reinforcing member is of multilimbed profile, of which one limb bears against the upper tine ends.

3. A rake according to claim 2, wherein the limb of the reinforcing means bearing against the upper tine ends is profiled.

4. A rake according to claim 2, wherein the limbs of the reinforcing means are arranged at right angles to each other.

5. A rake according to claim 2, wherein the profile is a U-profile, having its two limbs engaging around the upper tine ends.

6. A rake according to claim 1, wherein the reinforcing means is a wire.

7. A rake according to claim 6, wherein the reinforcing wire consists of the same material as the tines and is of the same thickness as the tines.

8. A rake according to claim 1, wherein the reinforcing means is secured at the upper tine ends in addition to being embedded in the crosshead.

9. A rake according to claim 5, wherein the U-profile is provided with longitudinal slots, into which the upper tine ends are fitted.

10. A rake according to claim 1, wherein the tines are individually formed to have a shape selected from V-shaped or U-shaped, each one being provided at its free end with a shape selected from a uniformly curved round shape or bend, and are bent outwards at each of the ends which are opposite to the free ends and are embedded side by side in one plane in the synthetic plastics material of the crosshead.

11. A rake according to claim 10, wherein the upper tine ends are bent outwards at an angle of approximately 30° from the longitudinal axis of the associated tine limb.

12. A rake according to claim 10, wherein the upper tine ends are bent outwards from the plane of the tine limbs.

13. A rake according to claim 1, wherein the tines consist of an uninterrupted continuous wire bent into a shape selected from a V-shape or U-shape and their anchoring portions provided at the upper tine ends are in each case formed by a curved part which joints the two neighbouring limbs of two tines and is completely embedded in the crosshead.

14. A rake according to claim 1, characterized in that the tines consists of spring steel.

15. A rake according to claim 1 wherein the tines consist of individual rod-shaped members which are substantially enclosed by plastics material and each tine is embedded individually at its respective upper end in the synthetic plastics material of the crosshead, the upper end of each tine being formed as an anchoring portion.

16. A rake according to claim 15 wherein the free end of each tine is exposed with respect to the plastics material enclosing the tine, said free end being provided with a substantially uniformly curved rounded shape.

* * * * *